Sept. 29, 1931.     E. FINSEN     1,825,112
GEAR GENERATING MACHINE
Filed June 6, 1929     3 Sheets-Sheet 1
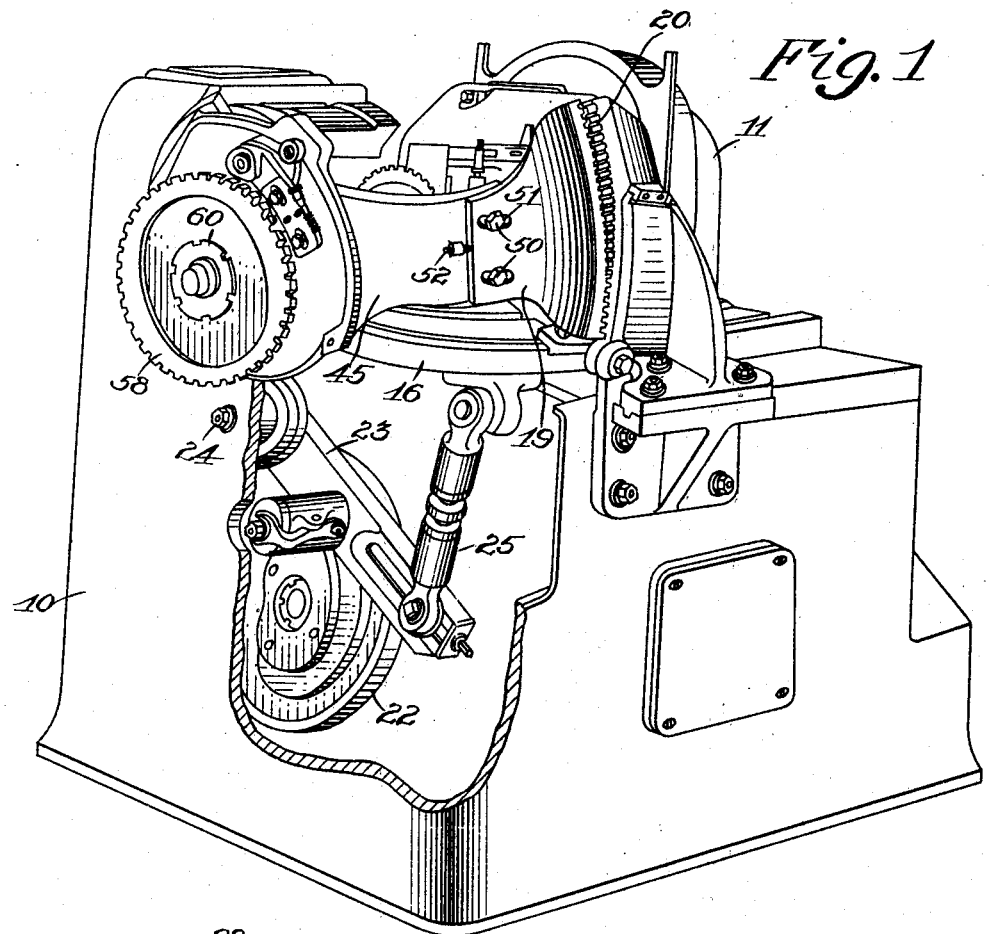
Fig. 1
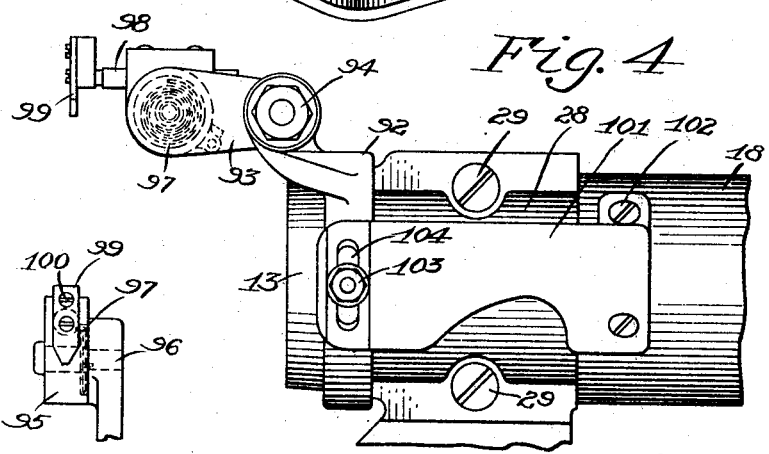
Fig. 4
Fig. 5
INVENTOR.
Eyvind Finsen
BY
his ATTORNEY Sept. 29, 1931.  E. FINSEN  1,825,112
GEAR GENERATING MACHINE
Filed June 6, 1929  3 Sheets-Sheet 2

INVENTOR
Eyvind Finsen
BY
B. Schlesinger
his ATTORNEY

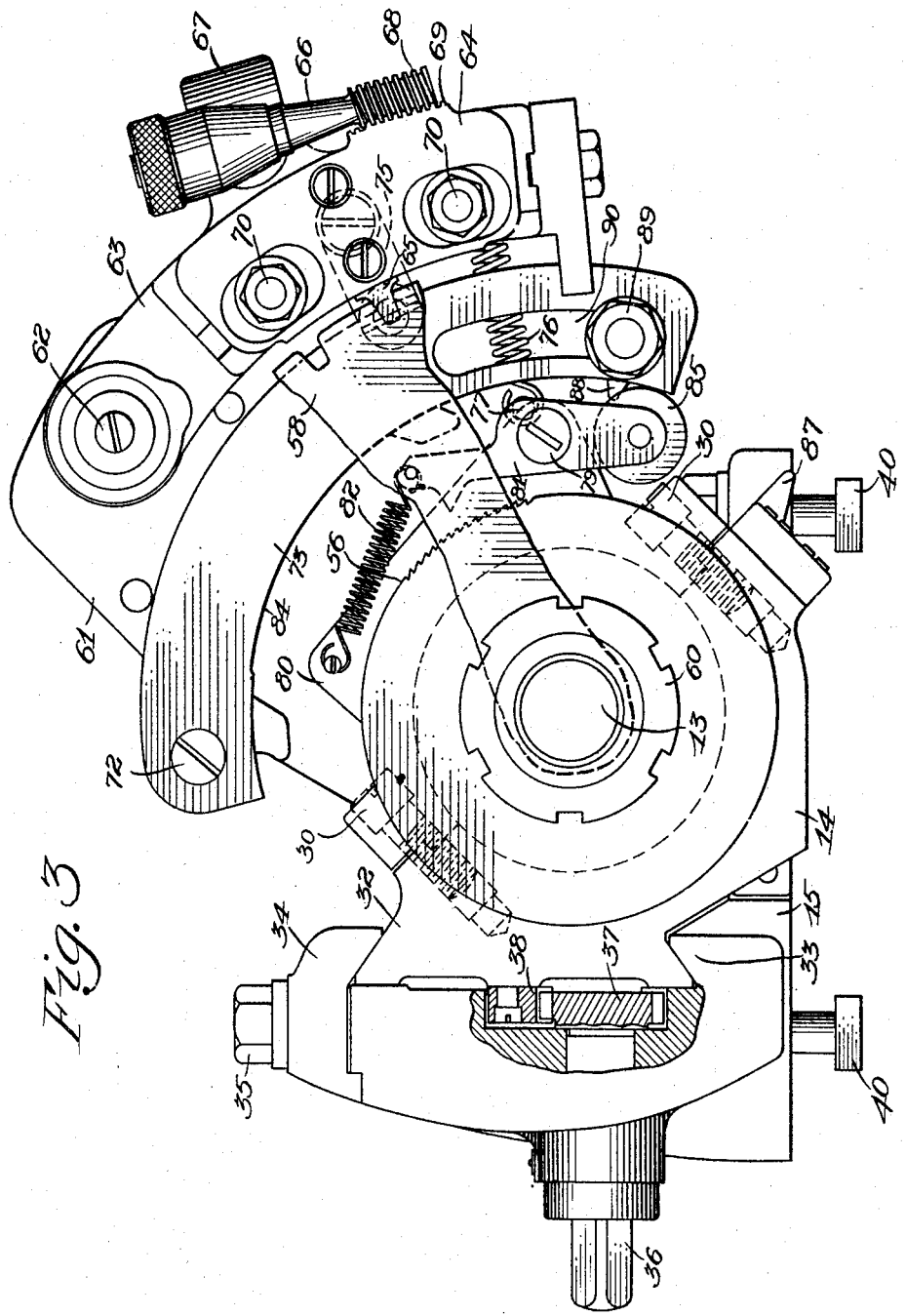

Patented Sept. 29, 1931

1,825,112

UNITED STATES PATENT OFFICE

EYVIND FINSEN, OF ROCHESTER, NEW YORK, ASSIGNOR TO GLEASON WORKS, OF ROCHESTER, NEW YORK, A CORPORATION OF NEW YORK

GEAR GENERATING MACHINE

Application filed June 6, 1929. Serial No. 368,865.

The present invention relates to machines for producing gears and particularly to machines for producing tapered gears such as bevel and hypoid gears. In a more particular aspect, the present invention has reference to that type of gear generating machine in which the rotation of the work required for generation is produced by the roll of a gear segment connected to the work spindle on a gear segment having a fixed relation to the tool.

One object of the present invention is to make possible in a machine of the type described, a more rigid structure while at the same time making easier of attainment that extreme accuracy in the mounting and operation of the various parts which is required in present day gear cutting practice.

A further object of this invention is to provide in a machine of the type described an adjustment for the work segment which will permit of modifying to a desired degree the tooth profiles of the gear to be cut on the machine, which will permit of one segment taking care of a range of jobs having different pitch cone angles, and which will permit of duplicating gears cut on a geared roll machine.

Other objects of the invention will be apparent hereinafter from the specification and from the recital of the appended claims.

In the drawings:

Figure 1 is a perspective view of a straight tooth bevel gear generating machine embodying in its construction the features of this invention, a part of the frame being broken away for the purpose of illustration;

Figure 3 is a rear elevation of the work head;

Figure 4 is a detail view showing in side elevation the stock dividing gauge; and Figure 5 is a fragmentary front elevation of the same.

Figure 2:
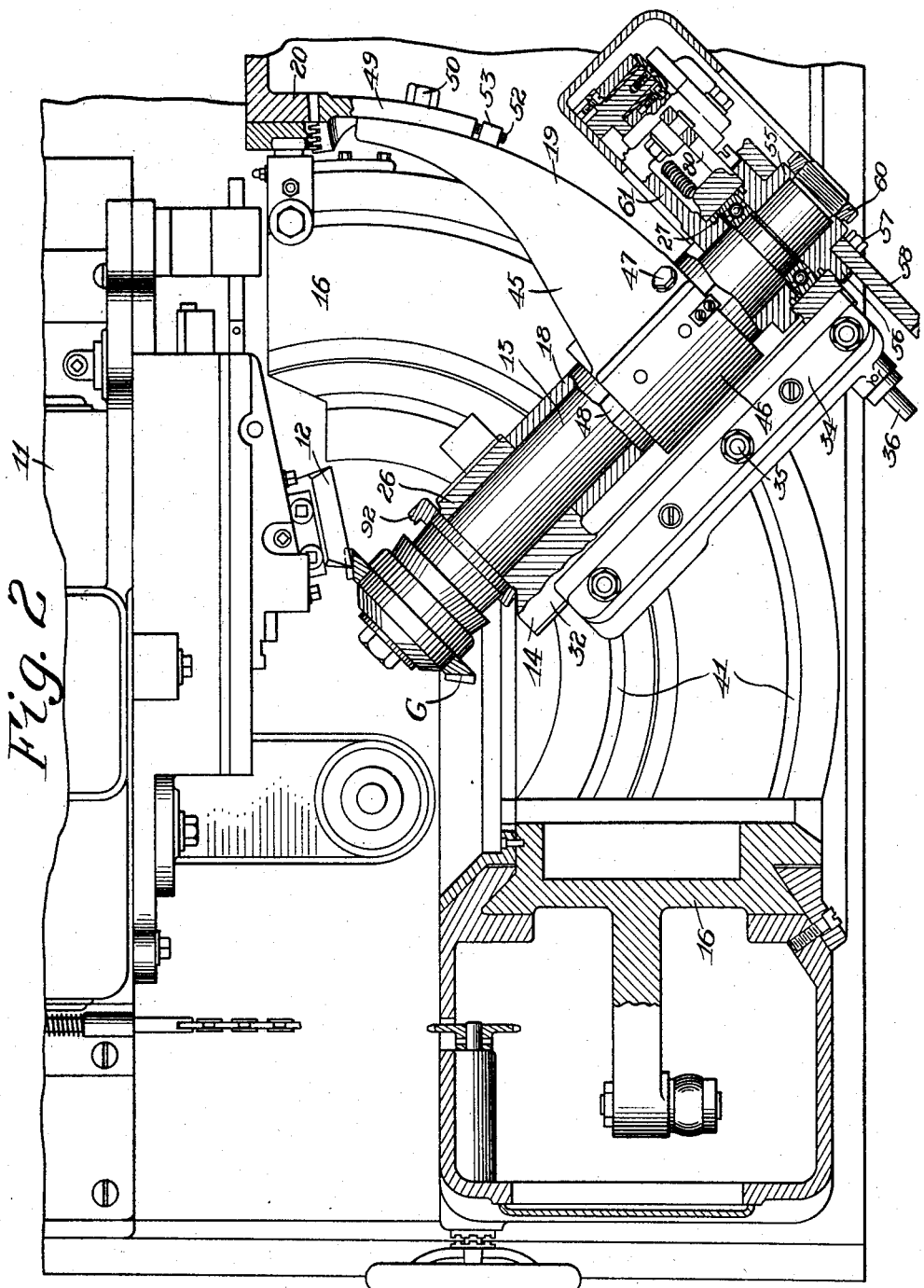
Figure 2 is a fragmentary plan view of this machine, parts being shown in section.

10 indicates the base or frame of the machine, 11 the tool head which is slidably mounted on the base or frame 10, and 12 one of the cutting tools. The gear to be cut is designated at G. It is secured to the work spindle 13 by any suitable type of chucking apparatus. The work spindle 13 is mounted on the work head 14 and this in turn is mounted on a swinging base 15 which is adjustably secured to the cradle 16. Mounted on the work spindle 13 is a sleeve 18 to which is connected a segment, indicated generally at 19, which is adapted to roll on a second segment 20. The segment 20 is pivoted to a relatively fixed part of the machine.

The cradle 16 is oscillated by a cam 22 through the lever arm 23 which is pivotally mounted at 24 on the frame and which is connected with the cradle by the link 25. The lever arm 23 carries a roller (not shown) which engages with the cam 22.

The tools reciprocate to cut simultaneously opposite sides of a tooth of the gear blank G and the cam 22 is rotated continuously, thus oscillating the cradle 16 and rolling the segment 19 on the stationary segment 20. While the work is in engagement with the tool, the sleeve 18 is connected to the work spindle 13 so that the motion of the segment 19 is imparted to the work spindle. This motion combines with the oscillatory movement of the cradle to produce the generating roll required to generate the profiles of the teeth of the gear. When one tooth has been completely generated, the tool head is withdrawn away from the work by a cam (not shown) mounted on the same shaft with the generating cam 22. During the period of withdrawal, the work is indexed by rotation of the sleeve relative to the work spindle. When the indexing operation has been completed, the tools are again returned into cutting engagement with the blank to cut the next tooth.

The means for reciprocating the tools, the drive to the cam for oscillating the cradle and to the feed cam which controls the movement of the tool head will not be described here further as they form no part of the present invention. Reference may be had to Patent No. 1,660,502 issued to James E. Gleason et al. February 28, 1928, for a more detailed description of these mechanisms.

The segment 20 shown is of the pivotal type and for a more detailed description of the structure of this segment and of the generating cam 22, reference may be had to my pending application No. 312,173, filed October 12, 1928. The present invention deals with the mounting of the work spindle in the work head, the mounting of the work head on the swinging base, the construction of the work segment, the stock-dividing apparatus, and the index mechanism.

In machines of the type to which this invention refers as heretofore constructed, the work spindle has been mounted in the sleeve and the sleeve journaled in suitable bearings in the work head. As it is necessary that the spindle be mounted with extreme accuracy in order that a gear of correct tooth proportions be generated, this has meant that heretofore the bore of the sleeve has had to be ground accurately for its entire length and the work spindle has had to be ground accurately for its entire length to fit this bore.

With the present invention, the work spindle 13 is journaled directly in the work head 14. For this purpose, spaced bearings are provided on the work head. In the preferred construction, the forward bearing indicated at 26 is a plain bearing and the rear bearing indicated at 27, a ball bearing. Both bearings are capped bearings. The cap 28 of the forward bearing which is secured in position by the screws 29 is shown in Figure 4 while the structure of the rear capped bearing is clearly illustrated in Figure 3, the screws 30 designating in this figure the screws for securing the rear cap in place. The sleeve 18 is rotatably mounted on the spindle 13 between the two bearings.

The improved spindle mounting makes it possible to secure the required accuracy with much greater ease and at the same time the spindle is mounted more rigidly on the work head than with any prior construction. With the new construction, only the bearing 26 and that portion of the bore of the work head in which the ball bearing 27 seats requires grinding or scraping as contrasted with the grinding of the bore of the sleeve for its full length in prior constructions. The spindle 13 need only be ground for those portions of its length which seat in the bearings, though for convenience, it is usual practice to grind the spindle for its full length. It is much easier with the short plain bearing mounting at one end and the ball bearing mounting at the other end to get the spindle mounted correctly than where the accuracy of mounting depends upon the success with which the spindle and sleeve are ground. If the spindle bearings wear, the spindle can be very easily removed from the work head by taking off the bearing-caps. The front bearing can be reground or rescraped and if necessary a new ball bearing inserted for the rear bearing. The ease with which wear can be taken care of is another advantage of the present invention.

The work head 14 is formed with a dove-tailed projection 32 at one side, as clearly seen in Figure 3. By means of this projection 32, the work head is secured to the swinging base 15. The dove-tailed portion 32 rests at one side in a way 33 formed on the swinging base and is held at its other side to the swinging base by a gib 34 which is shaped to conform to this side of the projection 32. The gib 34 is clamped to the swinging base by bolts 35. The work head 14 can be adjusted on the ways thus formed by rotation of the stud shaft 36 which is journaled in the swinging base 15 and carries a pinion 37 that meshes with a rack 38 which is secured to the work head. Through this adjustment, the work spindle can be moved to adjust the gear blank G to be cut to the correct cone distance.

The swinging base 15 is adjustable on the cradle 16 angularly in order to adjust the root cone of the gear blank into tangency with the cutting plane. The base 15 is secured in any adjusted position by means of T-bolts 40 which engage in arcuate T-slots 41 formed in the upper face of the cradle 16.

The segment 20 may be a bevel gear segment as described in Patent No. 1,660,502 above mentioned, or a crown gear segment as described in my pending application above referred to. As already stated, the latter type segment is shown in the accompanying drawing. The segment 19 is selected with reference to the pitch cone angle of the gear to be generated. With the present invention, the segment 19 is made in two parts adjustable with reference to each other. The inner part of the segment 19 is in the form of an arm 45 which is secured by the bolts 47 to a sleeve 46 that fits onto the sleeve 18. The sleeve 18 is provided with a longitudinal spline and the split sleeve 46 correspondingly recessed to permit movement of the sleeve 18 with the work head toward and away from the tools without changing the position of the segment 19. The outer end portion 49 of the segment 19 is toothed and meshes with the crown gear segment 20. The contacting surfaces of the portions 45 and 49 are curved about the center of the machine—in a bevel gear generating machine, about the intersection of the axis of the work spindle and the axis of the cradle. The outer portion 49 is adjustably secured to the inner portion 45 by the bolts 50 which are secured in the inner portion 45 and pass through slots 51 formed in the outer portion 49. A very fine adjustment of the outer portion 49 on the inner portion 45 can be effected by rotation of the screw 52 which threads into a lug 53 formed on the inner arm portion 45 and abuts against the end face of the outer segment portion 49.

If the machine is operated according to the principles of my application No. 312,173, the segment 19 in the zero position of adjustment of the outer portion 49 on the inner portion 45 will have the same pitch cone angle as the pitch cone angle of the gear to be generated. It is sometimes desirable to modify the profile curvature of the teeth of a gear from theoretical form to secure a desirable modification in tooth profile bearing. This can be done very readily with the present invention by adjustment of the outer portion 49 of the segment 19 on the arm 45 for, it will be seen, that if the segment 19 has been selected to correspond in the zero position of its adjustment with the pitch cone angle of the gear to be generated, that any adjustment of the segment will effect a change in the roll of the gear blank relative to the tools with a consequent modification in the tooth profile generated.

By means of this same adjustment of the segment 19 it is also possible to use a single segment to generate gears of different pitch cone angles within a limited range. This reduces the number of segments required with a generating machine of the type described in order to cover the full capacity of the machine and consequently very materially reduces the cost of the fully equipped machine to the user.

In Gleason machines of the geared-roll type, the tool represents a nominal crown gear, that is, a crown gear having a plane top surface and a pitch cone angle slightly less than 90°. In generating a gear on such a machine, the blank rolls relative to the tool as though rolling on the nominal crown gear but with a ratio of roll equal to that which would be used if the blank were rolling with a true crown gear. It is sometimes desirable to duplicate on a segment-roll machine gears such as are generated on a geared-roll machine. This can be done very readily through the improvement of the present invention by adjusting the work segment 19 so that its pitch cone angle is enough less than the pitch cone angle of the blank to obtain the same ratio of roll used on the geared roll machine.

The machine shown in the accompanying drawings is of the intermittent indexing type and as in the machine of the patent and of the application above referred to, the indexing is effected by the generating roll. Improvements have been made in the present machine both in the form of index mechanism itself and in the manner in which this index mechanism is mounted to connect the sleeve 18 and work spindle. These features will be described now. Secured to the spindle 13 at its outer end (Fig. 2) is a sleeve 55 which has formed integral with it a ratchet wheel 56. Mounted on the sleeve 55 and secured to the ratchet wheel as by bolts 57 is an index plate 58 (Figs. 1 and 3) which is provided with a series of notches equal to or a multiple of the number of teeth in the gear to be cut. The nut 60 serves to hold the index plate and ratchet wheel on the work spindle and the two are keyed or otherwise secured to the spindle so as to move therewith. The sleeve 55 and the ratchet wheel 56 and index plate 58 carried thereby are mounted on one side of the ball bearing 27.

Secured to the sleeve 18 at the other side of this ball bearing is a fan-tail or arm 61. Pivotally mounted on this arm 61, as at 62, is an arm 63. Adjustably mounted on the arm 63 is a part 64 which carries a locking-dog 65 that is adapted to be engaged with the notches of the index plate 58. The part 64 can be adjusted on the arm 63 to rotate the index plate 58 and the spindle 13 to which the plate is secured for slightly changing the position of the blank relative to the tools by rotation of the worm shaft 66 which is rotatably mounted in a lug 67 formed integral with the arm 63 and which carries a worm 68 that meshes with a worm wheel segment 69 cut on the part 54. The bolts 70 serve to secure the part 64 in any adjusted position on the arm 63. This adjustment is used in stock-dividing or to permit taking off more stock.

Pivotally mounted on the arm or fan-tail 61 at a point 72 internal of the periphery of the notched index plate 58 is a lever 73. This lever 73 is connected to the arm 63 that carries the locking dog 65 by a link 75 so that the arm 63 and lever 73 move together. They are constantly urged into position where the locking dog 65 engages one of the notches of the index plate 58 by a spring 76 which is secured at one end to the arm 63 and at its opposite end to a pin 77 that is secured in the fan-tail 61.

Pivotally mounted, as at 79 on a plate 80 which is secured to the cap of the rear spindle bearing 32 is a pawl 81 which is adapted to engage the ratchet wheel 56. This pawl 81 is constantly urged into engagement with the ratchet wheel 56 by the spring 82 which is secured at one end to the pawl and at its opposite end to the plate 80. The pawl is held out of engagement with the ratchet wheel, however, during cutting, by the lever arm 73, the inside face 84 of which is formed as a cam surface which is adapted to engage a roller 85 that is mounted on the pawl 81 at the outer end of the pawl. Secured to the work head 14 is a lug 87 which serves to engage, in the roll of the work spindle, a lug 88 that is adjustably mounted on the lever 73 by means of a bolt 89 which engages in a slot 90 formed in the lever 73.

Figure 3 shows the parts of the indexing mechanism in the position that they assume while a tooth is being cut. The locking dog 65 is in engagement with one of the notches of the index plate 58 thus connecting the spindle 13 to the sleeve 18 so that the roll of the segment 19 on the crown gear segment 20 is communicated to the work spindle. At the same time, the pawl 81 is held out of engagement with the ratchet wheel 56 by engagement of the cam surface 84 of the lever arm 73 with the roller 85 which is mounted on the pawl 81. As the sleeve 18 rotates due to the roll of the segment 19 on the segment 20, the lug 88 on the lever 73 will be brought into engagement with the lug 87 on the relatively stationary work head 14 and will ride up on the lug 87 rocking the lever 73 about its pivot 72 and lifting the locking dog 65 out of engagement with the index plate 58 through the link connection 75 between the lever 73 and the arm 63. As the lever 73 rocks upward, the cam surface 84 is disengaged from the roller 85 and the pawl 81 released. The spring 82 then acts immediately to engage the pawl 81 with the ratchet wheel 56. The dog 65 is now disengaged from the index plate 58 disconnecting the work spindle 13 and the sleeve 18 while the pawl 81 is now engaged with the ratchet wheel 56 connecting the work spindle 13 to the work head 14. The work spindle 13 is now held stationary but the sleeve 18 continues to rotate under actuation of the segment 19. When in the further movement of the sleeve 18 the lug 88 rides off of the lug 87, the locking dog 65 will drop back onto the plate 58 under actuation of the spring 76 and will engage a new notch in the index plate. As soon as the dog engages the new notch of the plate the cam surface 84 of the lever 73 will re-engage the roller 85 of the pawl 81 thus withdrawing the pawl 81 from engagement with the ratchet wheel 56. The dog 65 and index plate 58 will be again reconnected with the dog engaged in a different notch of the index plate so that the work spindle will have been indexed relative to the sleeve 18 to bring a new tooth of the gear blank G into engagement with the tools 12 on the further roll of the machine. When the index has been completed the roll will be reversed by the cam 22 and the sleeve will roll back. In this backward roll of the sleeve 18, the lug 88 will ride over the lug 87 without lifting the lever 73 because the lug 88 is so mounted that on the backward roll of the sleeve 18, it will pivot on the plate by which it is secured to the bolt 89. By setting the lug 88 at any suitable point in the slot 90 of the lever 73, the index mechanism can be adjusted to trip at any desired point in the roll as may be required in the cutting of different gears.

The use of the double-armed link-connected arrangement 73—63—75 obviates the use of a very long arm 63 which would be required were the cam surface 84 formed on this arm, keeps the whole mechanism in a small compass and reduces the amount of roll required to effect generation and indexing. The use of a ball bearing 27 for the rear spindle bearing instead of a plain bearing enables the whole index mechanism to be kept in a small compass and the fan-tail 61 and the notched plate 58 to be brought close together, thus making possible a very rigid structure.

The machine shown is a finishing generator. The gear blank to be cut is roughed out on another machine and finished out on this machine. To finish generate the gears properly it is necessary to position the roughed blank on the work spindle so that the tool in cutting will generate proper profiles on both sides of the gear teeth. To position the blank correctly on the work spindle, a stock dividing gauge is used. This gauge is shown in Figures 4 and 5 but is broken away in Figure 2 for the purpose of illustration. The gauge includes the ring member 92 which is mounted on the nose of the work spindle 13, the arm 93 which is secured to the ring 92 by the bolt 94, the plate 95 which is pivotally mounted on the arm 93 by means of the pin 96 and is normally held in the position shown in Figures 4 and 5 by the coil spring 97 which is secured at one end to the plate 95 and at its other end to the arm 93, the bar 98 which is slidably adjustable in the plate 95 and the finger 99 which is secured to the bar 98 by the screws 100. The ring 92 is held on the work spindle 13 by the plate 101 which is secured at one end to the sleeve 18 by the screws 102 and which is adjustably connected at its other end to the ring 92 by the bolts 103 which engages in the slot 104 in the plate.

The finger 99 will be shaped to engage in a tooth space of the roughed gear blank and the ring 92 is adjustable relative to the plate 101 as required to take care of blanks of different pitches. In use, the stock dividing finger 99 will be adjusted relative to the tools so that when it is engaged with the roughed gear, the gear will have been correctly adjusted to the tools. To use the stock dividing gauge, the plate 98 is rocked about the pivot 96 to engage the finger 99 with a tooth space of the roughened blank and the roughened blank is adjusted on the spindle until it is properly engaged by the finger 99. Then the blank is locked to the spindle by the chucking mechanism and the finger 99 released. The finger immediately moves to the position shown in the drawing under actuation of the spring 97.

While the invention has been described in connection with a machine for generating straight tooth gears, it will be understood that the features of the invention are equally applicable to a machine for generating longitudinally curved tooth gears such as described in the copending application of James E. Gleason et al. No. 220,785, filed September 20, 1927 and that the features of the invention, moreover, are applicable equally to machines in which all of the generating roll is on the work and machines in which the generating roll is divided between the tools and the work. The former type is shown in the accompanying drawings, while a machine of the latter type is illustrated in Patent No. 1,385,200 issued to E. W. Bullock et al., July 19, 1921.

In general it may be said that while the invention has been described in connection with a particular embodiment and in connection with a particular use for that embodiment, it will be understood that it is capable of further modification and use and that this application is intended to cover any variations, uses, or adaptations of the invention following, in general, the principles of the invention and including such departures from the present disclosure as come within known or customary practise in the gear art and as may be applied to the essential features hereinbefore set forth and as fall within the scope of the invention or the limits of the appended claims.

Having thus described my invention, what I claim is:

1. In a gear generating machine, the combination with a work support, a tool support, a cradle on which one of said supports is mounted, and means for rotating the cradle, of a work spindle journaled directly in the work head, a sleeve mounted on the work spindle, a segment connected to the sleeve, a segment having a fixed relation to the tool on which the first segment rolls, and indexing mechanism adapted to connect the work spindle and sleeve during cutting said indexing mechanism being operated by the relative rolling movement of said segments.

2. In a machine for generating gears, a tool support, a work support provided with spaced bearings, a work spindle journaled in the bearings of the work head, a sleeve rotatably mounted on the work spindle between said bearings, an arm connected to the sleeve, a gear segment secured to said arm, a second gear segment having a fixed relation to the tool mechanism, means for oscillating one of said supports, and indexing mechanism adapted to connect the sleeve to the spindle during cutting said indexing mechanism being operated by the relative rolling movement of said segments.

3. In a machine for generating gears, the combination with a work support provided with spaced bearings, a tool support, a cradle on which one of said supports is mounted, and means for rotating the cradle, of a work spindle journaled directly in the work head, a sleeve mounted on said spindle between said bearings, a segment connected to the sleeve, a segment having a fixed relation to the tool on which the first segment rolls, and indexing mechanism comprising an index plate secured to the work spindle at its rear end, an arm secured to the sleeve, and means carried by the arm which straddles the rear spindle bearing for connecting the sleeve to the spindle during cutting said indexing mechanism being operated by the relative rolling movement of said segments.

4. In a machine for generating gears, the combination with a work support provided with spaced bearings, the forward one of which is a capped plain bearing, a tool support, a cradle on which one of said supports is mounted, and means for rotating the cradle, of a work spindle journaled directly in said bearings, a sleeve mounted on said spindle between said bearings, a segment connected to the sleeve, a segment having a fixed relation to the tool on which the first segment rolls, and indexing mechanism for connecting the sleeve to the spindle during cutting said indexing mechanism being operated by the relative rolling movement of said segments.

5. In a machine for generating gears, the combination with a work support provided with spaced bearings of which the forward bearing is a capped plain bearing and the rear bearing is an anti-friction bearing, a tool support, a cradle on which one of said supports is mounted, and means for rotating the cradle, of a work spindle journaled directly in the work support bearings, a sleeve mounted on said spindle between said bearings, a segment connected to the sleeve, a segment having a fixed relation to the tool on which the first segment rolls, and indexing mechanism comprising an index plate secured to the work spindle at its rear end, an arm secured to the sleeve, and means carried by the arm which straddles the rear spindle bearing for connecting the sleeve to the spindle during cutting said indexing mechanism being operated by the relative rolling movement of said segments.

6. In a machine for generating gears, a tool mechanism, a work spindle and sleeve rotatably mounted relatively to each other, a segment having a splined connection with said sleeve and extending at one side of the spindle, a segment having a fixed relation to the tool mechanism on which the first segment rolls, a work head on which the sleeve and spindle are rotatably mounted having a dove-tailed portion extending parallel to the axis of the work spindle and lying on the side of the spindle opposite from said segment, a cradle having ways shaped to receive said dove-tailed portion of the work head and means for moving the tool head on said ways to move the work toward or from the tool mechanism.

7. In a gear generating machine, the combination with a work support provided with spaced bearings, a tool support, a cradle on which one of said supports is mounted and means for rotating the cradle, of a work spindle journaled directly in said work head, a sleeve mounted on said spindle between said bearings, a segment connected to the sleeve, a segment having a fixed relation to the tool on which the first segment rolls, indexing mechanism connecting said sleeve and spindle, and a stock-dividing gauge comprising a bar secured to the sleeve and straddling the forward spindle bearing, a ring mounted on the spindle and adjustably secured to the bar, and a finger pivotally mounted on said ring and adapted to be engaged in a tooth space of the gear to be cut.

8. In a gear generating machine, a support, a work spindle mounted on the support, a sleeve in which the work spindle is rotatable, a notched plate secured to the spindle, a ratchet wheel secured to the spindle, a pawl movably mounted on the support, an arm connected to the sleeve, a locking dog movably mounted on the arm adapted to engage the notches of said index plate, a lever pivotally mounted on said arm, means connecting the lever to the dog so that the two move together, means on the lever adapted to engage the pawl to hold the same out of engagement with the ratchet wheel when the dog is engaged with the plate, means for oscillating the sleeve, a lug on the lever, means on the support adapted to be engaged by said lug in rotation of the sleeve in one direction to lift said lever out of engagement with the pawl and simultaneously lift said locking dog out of engagement with the notched plate, and means for moving the pawl into engagement with the ratchet wheel when released.

9. In a gear generating machine, a support, a work spindle mounted on the support, a sleeve in which the work spindle is rotatable, a notched plate secured to the spindle, a ratchet wheel secured to the spindle, a pawl pivotally mounted on the support, an arm connected to the sleeve, a locking dog pivotally connected to the arm adapted to engage the notches of said index plate, a lever pivotally connected to the arm, a link connecting the lever to the dog so that the two move together, means on the lever adapted to engage the pawl to hold the same out of engagement with the ratchet wheel when the dog is engaged with the plate, means for oscillating the sleeve, a lug on the lever, means on the support adapted to be engaged by said lug on rotation of the sleeve in one direction to lift said lever out of engagement with the pawl and simultaneously lift said locking dog out of engagement with the notched plate, and means for moving the pawl into engagement with the ratchet wheel when released.

EYVIND FINSEN.